(12) United States Patent
Meier et al.

(10) Patent No.: US 11,714,898 B2
(45) Date of Patent: Aug. 1, 2023

(54) SECURITY SCANNING OF IMAGE FOR VIRTUAL MACHINE CREATION

(71) Applicant: SAP SE, Walldorf (DE)

(72) Inventors: Andreas Meier, Wilhermsdorf (DE); Thomas Grimmeisen, Bad Schonborn (DE)

(73) Assignee: SAP SE, Walldorf (DE)

( * ) Notice: Subject to any disclaimer, the term of this patent is extended or adjusted under 35 U.S.C. 154(b) by 36 days.

(21) Appl. No.: 17/407,740

(22) Filed: Aug. 20, 2021

(65) Prior Publication Data
US 2023/0056770 A1 Feb. 23, 2023

(51) Int. Cl.
| G06F 21/54 | (2013.01) |
| G06F 21/53 | (2013.01) |
| G06F 21/55 | (2013.01) |
| G06F 21/56 | (2013.01) |
| G06F 21/57 | (2013.01) |

(52) U.S. Cl.
CPC .............. *G06F 21/54* (2013.01); *G06F 21/53* (2013.01); *G06F 21/554* (2013.01); *G06F 21/566* (2013.01); *G06F 21/568* (2013.01); *G06F 21/577* (2013.01)

(58) Field of Classification Search
CPC ........ G06F 21/54; G06F 21/53; G06F 21/554; G06F 21/566; G06F 21/568; G06F 21/577
See application file for complete search history.

(56) References Cited

U.S. PATENT DOCUMENTS

| 8,813,233 B1 * | 8/2014 | Wilson ................. G06F 21/577 718/1 |
| 8,893,279 B1 * | 11/2014 | Chandrasekhar ....... G06F 21/56 726/24 |
| 9,756,070 B1 * | 9/2017 | Crowell .............. G06F 9/45533 |

(Continued)

OTHER PUBLICATIONS

Kisller "The Basics: 7 Alternatives To Docker: All-In-One Solutions and Standalone Container Tools", DEVOPS User Conference, May 10, 2021, 7 pages.

(Continued)

*Primary Examiner* — Trong H Nguyen
(74) *Attorney, Agent, or Firm* — Fountainhead Law Group P.C.

(57) ABSTRACT

Embodiments provide automated security scanning of incoming images for use in creating containers such as a Virtual Machines. Based upon attribute(s) of metadata of the incoming image, a security engine chooses from amongst stored scripts for mounting and execution by installation logic. Such scripts can relate to the scanning itself, and/or pre-scanning considerations (such as scan frequency). In one example, the meta data attribute identifies a relevant Operating System (OS) of the incoming image. Other meta data attributes such as •scan frequency, •most recent passed scan, •log information, and •contact information (for issuance of a possible alert), may also be considered as part of the processing of an incoming image. Embodiments may enhance security by avoiding introduction of vulnerabilities through image instantiation. Embodiments may also impart flexibility to conserve resources by selectively scanning according to a frequency and/or date of last successful passage of the image.

20 Claims, 7 Drawing Sheets

(56) References Cited

U.S. PATENT DOCUMENTS

2017/0109536 A1\* 4/2017 Stopel .................. G06F 21/577
2019/0306330 A1\* 10/2019 Ohba ................. H04N 1/00923
2020/0082094 A1\* 3/2020 Mcallister ................. G06F 8/77
2021/0173935 A1\* 6/2021 Ramasamy ........... G06F 21/577

OTHER PUBLICATIONS

Anonymous "Tenable.IO", Vulnerability Management Solution for Modern IT, downloaded on Jun. 30, 2021 fromm Internet www.tenable.com/products/tenable-io, 17 pages.

\* cited by examiner

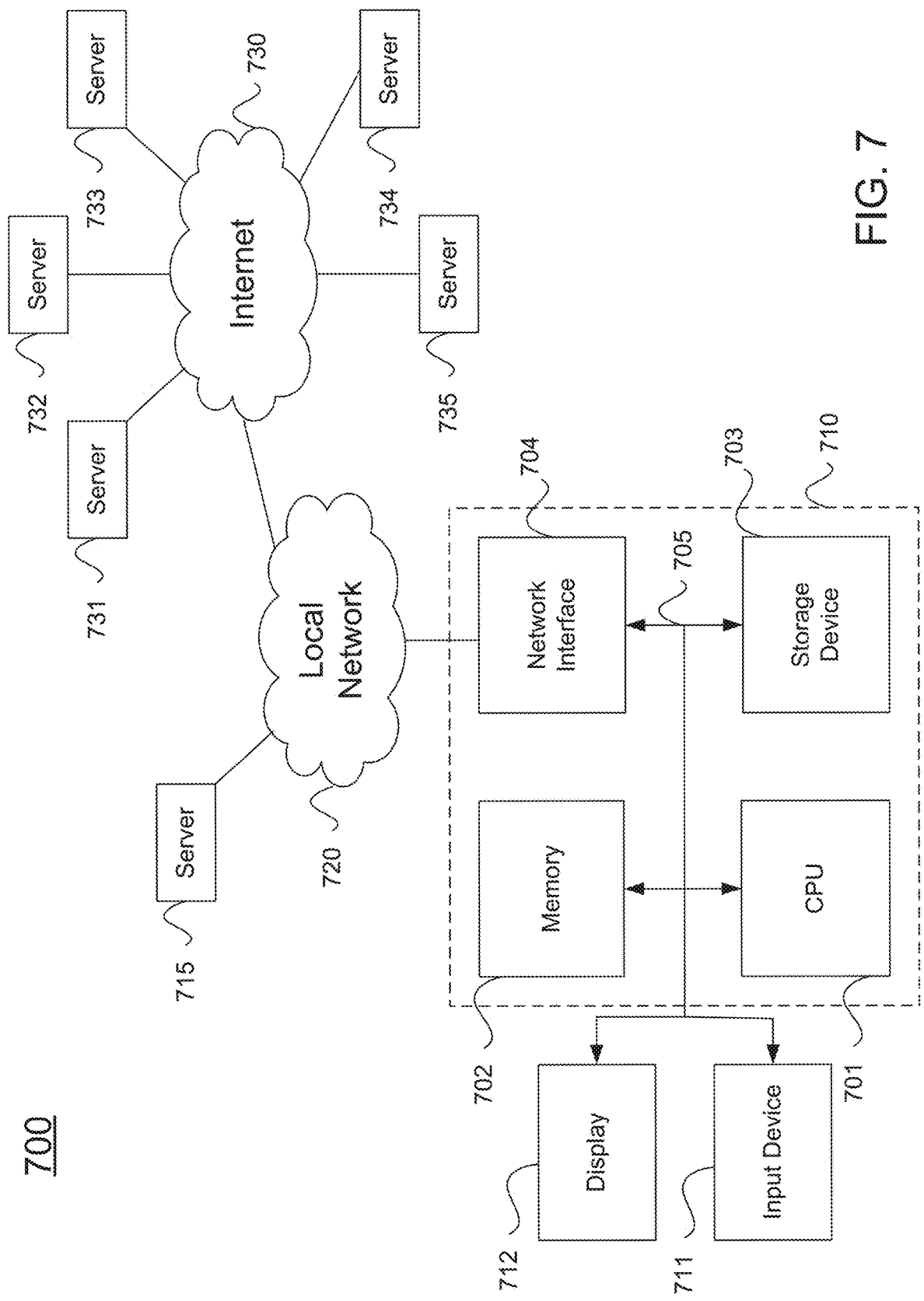

SECURITY SCANNING OF IMAGE FOR VIRTUAL MACHINE CREATION

BACKGROUND

Unless otherwise indicated herein, the approaches described in this section are not prior art to the claims in this application and are not admitted to be prior art by inclusion in this section.

A virtual machine (VM) is a computer system created using software on one physical computer, in order to emulate the functionality of another, separate physical computer. A VM may be created based upon an image.

Specifically, the image is a lightweight, standalone, executable package of software that includes code, runtime, system tools, system libraries, and settings for running an application. While the lifetime of such an image is typically short, importation of an insecure image into the original computer to create the VM, can give rise to security vulnerabilities.

SUMMARY

Embodiments provide automated security scanning of incoming images for use in creating containers such as a Virtual Machines. Based upon attribute(s) of metadata of the incoming image, a security engine chooses from amongst stored scripts for mounting and execution by installation logic. Such scripts can relate to the scanning itself, and/or pre-scanning considerations (such as scan frequency). In one example, the meta data attribute identifies a relevant Operating System (OS) of the incoming image. Other meta data attributes such as •scan frequency, •most recent passed scan, •log information, and •contact information (for issuance of a possible alert), may also be considered as part of the processing of an incoming image. Embodiments may enhance security by avoiding introduction of vulnerabilities through image instantiation. Embodiments may also impart flexibility to conserve resources by selectively scanning according to a frequency and/or date of last successful passage of the image.

The following detailed description and accompanying drawings provide a better understanding of the nature and advantages of various embodiments.

BRIEF DESCRIPTION OF THE DRAWINGS

FIG. 7 illustrates an example computer system.

DETAILED DESCRIPTION

Described herein are methods and apparatuses that implement security scanning of an image used to create a virtual machine. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

A typical lifetime of an instantiated image used to create a VM, may be a few minutes only. Such an image is not intended as long running machine with patch lifecycle inside. De-instantiation will not touch an image, so changes are lost.

Accordingly, an image is used to create a needed "pre-compiled" VM on-the-fly. That image allows a VM to act as a service, with same risk of attacks like other systems.

An image that is used to create a VM can be formed from scratch, or may be based upon another image. Typically, an image will be re-created only in case of needed changes/features.

The instantiation of an image used to create a VM, can create possible security vulnerabilities, for at least two reasons. First, there may not be procedures in place to generate a secure image. Second, a time delay between image generation and image instantiation could open the door to security vulnerabilities not yet recognized at the time of image generation.

Figure 1:
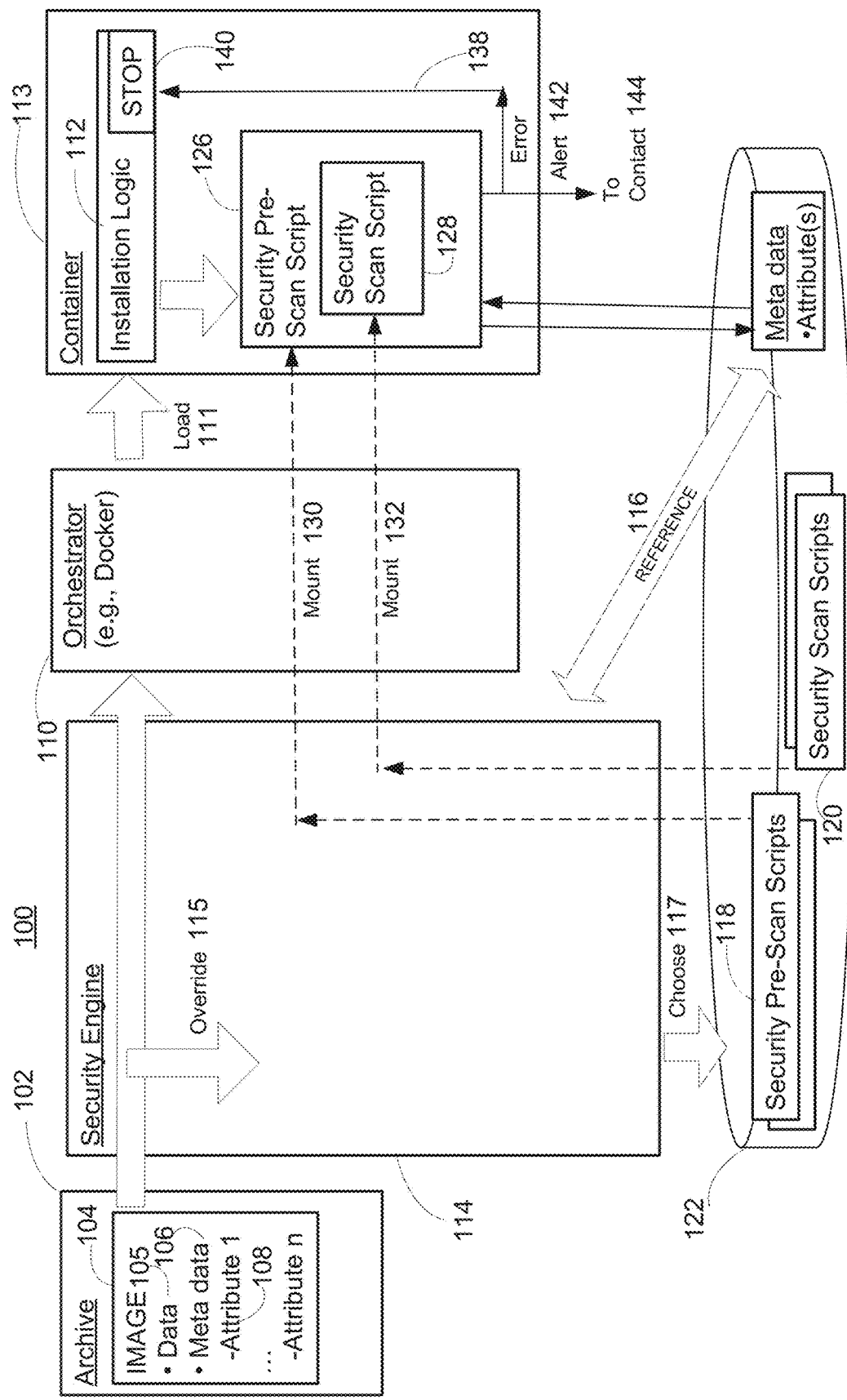
FIG. 1 shows a simplified diagram of a system according to an embodiment.

Accordingly, FIG. 1 shows a simplified view of an example system that is configured to implement image security scanning according to an embodiment. Specifically, system 100 comprises an image archive 102 in which images 104 are stored.

The images may include data 105 and meta data 106 in the form of attribute(s). According to one embodiment, an attribute 108 may identify an operating system (e.g., Linux or Windows).

An orchestrator 110 (e.g., DOCKER) is configured to receive an image from the repository. The orchestrator is then configured to load 111 the data of the image for execution according to an installation logic 112 to create a container 113 such as a Virtual Machine.

According to embodiments, a security engine 114 is positioned to also receive the incoming image. The security engine overrides 115 the incoming image and references 116 the image meta data including the attribute(s), in order to choose 117 from amongst Security pre-Scan scripts 118 and Security Scan scripts 120 stored in underlying database 122.

On the basis of the selection, the security engine then mounts 130 the chosen Security pre-Scan script 126 and mounts 132 the chosen Security Scan Script 128 via the orchestrator.

Initially, the installation logic causes the pre-Scan and Scan scripts to be executed, in order to determine if there is a security issue with the image. For example, the Security Pre-Scan script may examine attribute(s) such as a frequency of scanning and/or a "last good" scan of the particular image, to determine whether allocating (processing, memory, bandwidth) resources is justified to undertake a new security scan of the image.

If the attributes indicate that no new scan is needed, the image is installed.

On the other hand, the attributes may indicate that a new scan is warranted. For example, the "last good" scan for the image may have occurred long ago, with the possibility that security vulnerabilities in the image may have emerged to the awareness of the community in the intervening time.

Under such circumstances, the image is subject to a new security scan. Examples of such security scripts that can be executed upon the image can include but are not limited to PIPER scripts.

Depending upon the outcome of the new security scan of the image, the Security pre-Scan script may issue an error 138 and thereby instruct the installation logic to stop 140 installation of the image. This avoids introduction of a possible vulnerability by the image.

The Security pre-Scan Script may also provide further action. For example, the Security pre-Scan Script may issuing an alert 142 to a contact 144 (e.g., security officer) identified by an attribute.

Figure 2:
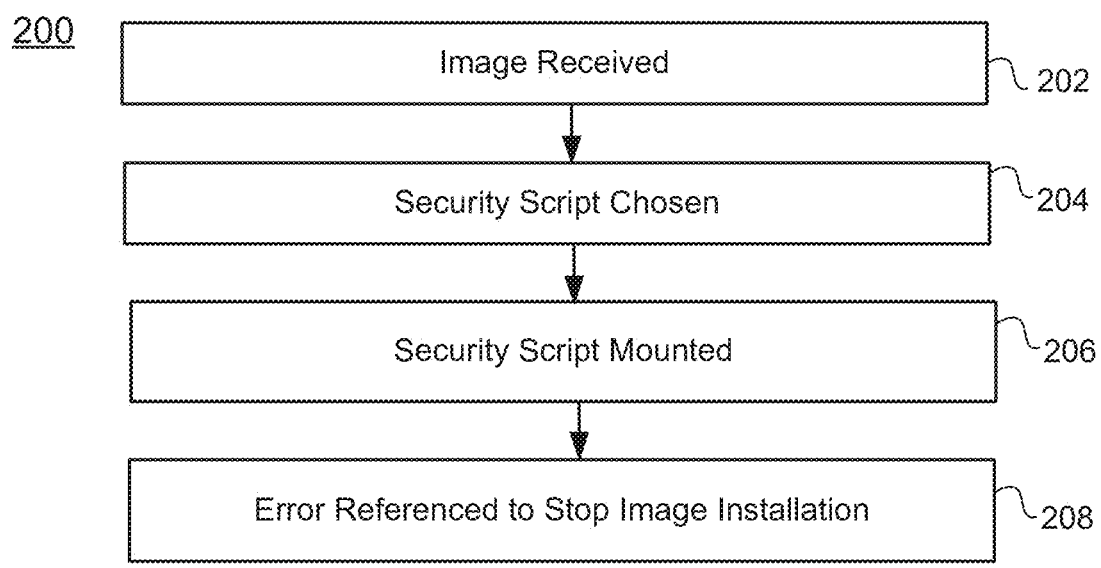
FIG. 2 shows a simplified flow diagram of a method according to an embodiment.

FIG. 2 is a flow diagram of a method 200 according to an embodiment. At 202, an image is received.

At 204, based upon a first attribute of meta data of the image, a Security Scan Script is chosen.

At 206, the chosen security script is mounted to the container.

At 208 execution of the security scan script by an installation logic, may result in an error output. That error is referenced to stop installation of the image, and thereby avoid introduction of a security vulnerability.

Systems and methods according to embodiments, may avoid one or more issues that may be associated with container creation. For example, embodiments offer flexibility in executing security scans that are appropriate to the incoming image.

That is, a meta data attribute identifying the operating system may be automatically recognized, and the appropriate security scan implemented. This avoids the manual cost and effort of a user having to identify the operating system as a basis for the security scan.

Embodiments also offer economy of effort. Specifically, an attribute from image metadata can be referenced to determine that a particular image has already recently passed security scanning. This avoids the loss of scarce (processing/memory/bandwidth) resources that would otherwise be consumed to scan a relatively low-risk (recently passed) image.

Further details regarding image security scanning according to various embodiments, are now provided in connection with the following example.

EXAMPLE

Figure 3:
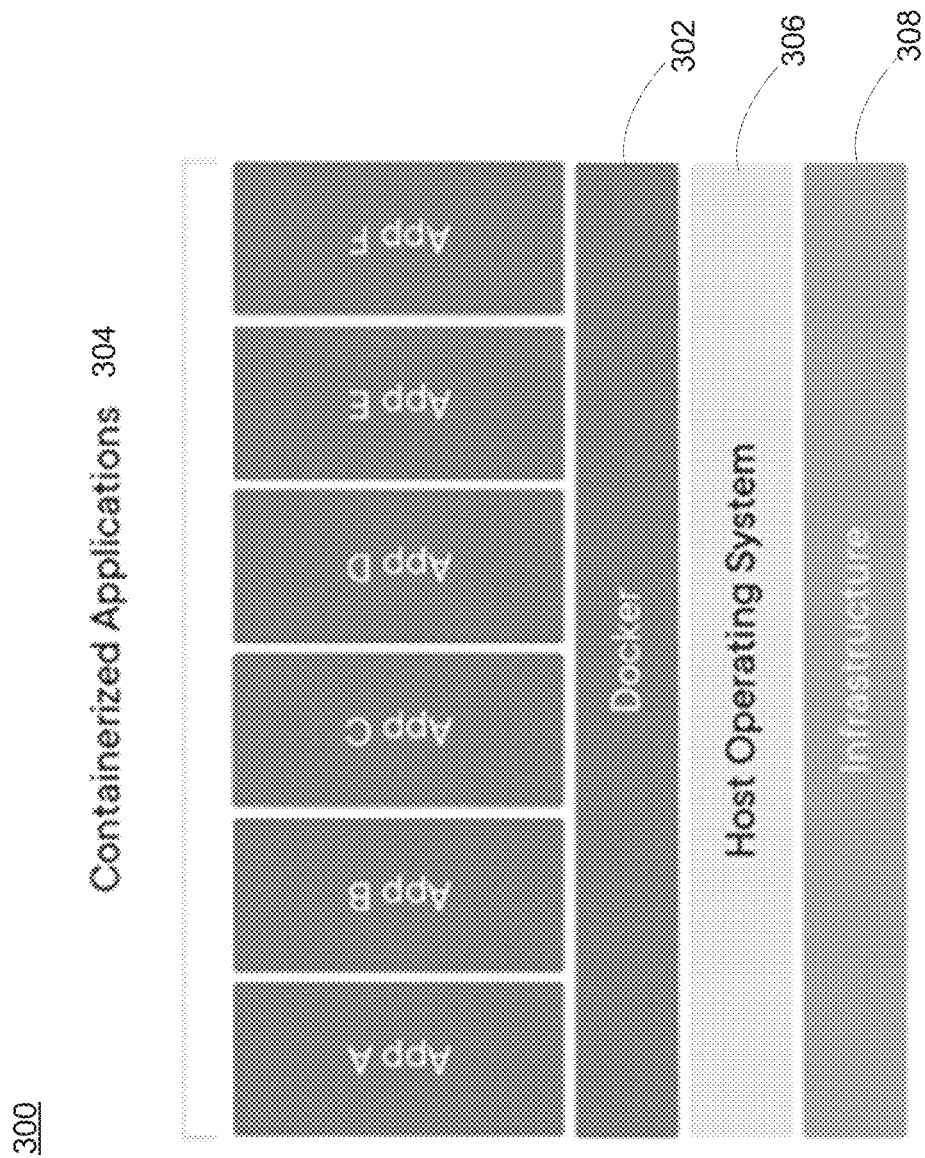
FIG. 3 shows a simplified view of an architecture for implementing image security scanning according to an exemplary embodiment.

FIG. 3 shows a simplified view of an architecture 300 for implementing image security scanning according to an exemplary embodiment. Here, DOCKER 302 serves as an orchestrator between containerized applications A-F 304, and the host operating system 306 and underlying infrastructure 308.

At least two options are possible to scan images.
a) Scan at a frequency by instantiating images without having a trigger for the scan. This option can cost additional hardware capacity, but may not involve additional execution time.
b) Scan during instantiation. This option does not cost additional hardware capacity, but may involve additional execution time.

For the option a), scan frequency can be defined. For the option b), it may be difficult to know in advance when/how often an image will be instantiated. Accordingly embodiments may store a record of past scans so as to ensure to not scanning too often.

Figure 4:
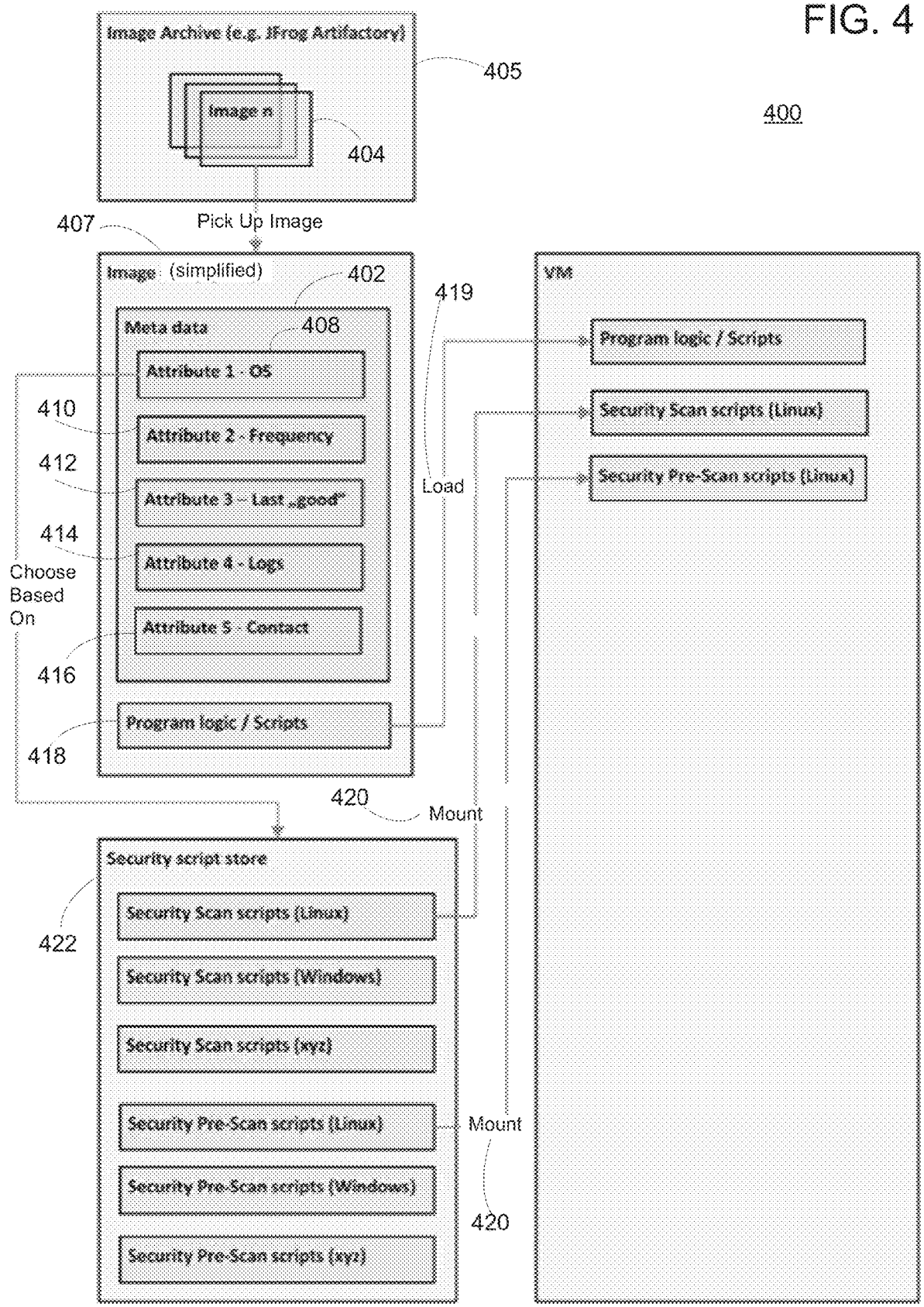
FIG. 4 shows a simplified diagram illustrating a flow of image security scanning according to an exemplary embodiment.

FIG. 4 shows a simplified diagram illustrating a flow 400 of image security scanning according to an exemplary embodiment. Specifically, embodiments may enrich meta data 402 of an image 404 received from an archive 405, according to one or more attributes.

Such attributes of image meta data of an enriched image 407 can include but are not limited to:
Attribute 1 408; information about OS within the image;
Attribute 2 410; information about needed scan frequency in value of acceptable time slot;
Attribute 3 412; date/time when last scan resulted in "all good";
Attribute 4 414; logs of last scan, with log or similar information offered by scan tool(s); and/or
Attribute 5 416 contact details of image technical contact and/or image owner.

During image instantiation, program logic/scripts 418 from the image are loaded 419. Also, it is possible to mount 420 an additional folder with additional files 422 containing Security Scan scripts and Security pre-Scan scripts. Such files can be accurately chosen based upon the Attribute 1 (OS), e.g. Linux, Windows, or other (xyz) based. It is also possible to specify that scan logic will be performed first, instead of original logic.

Figure 5:
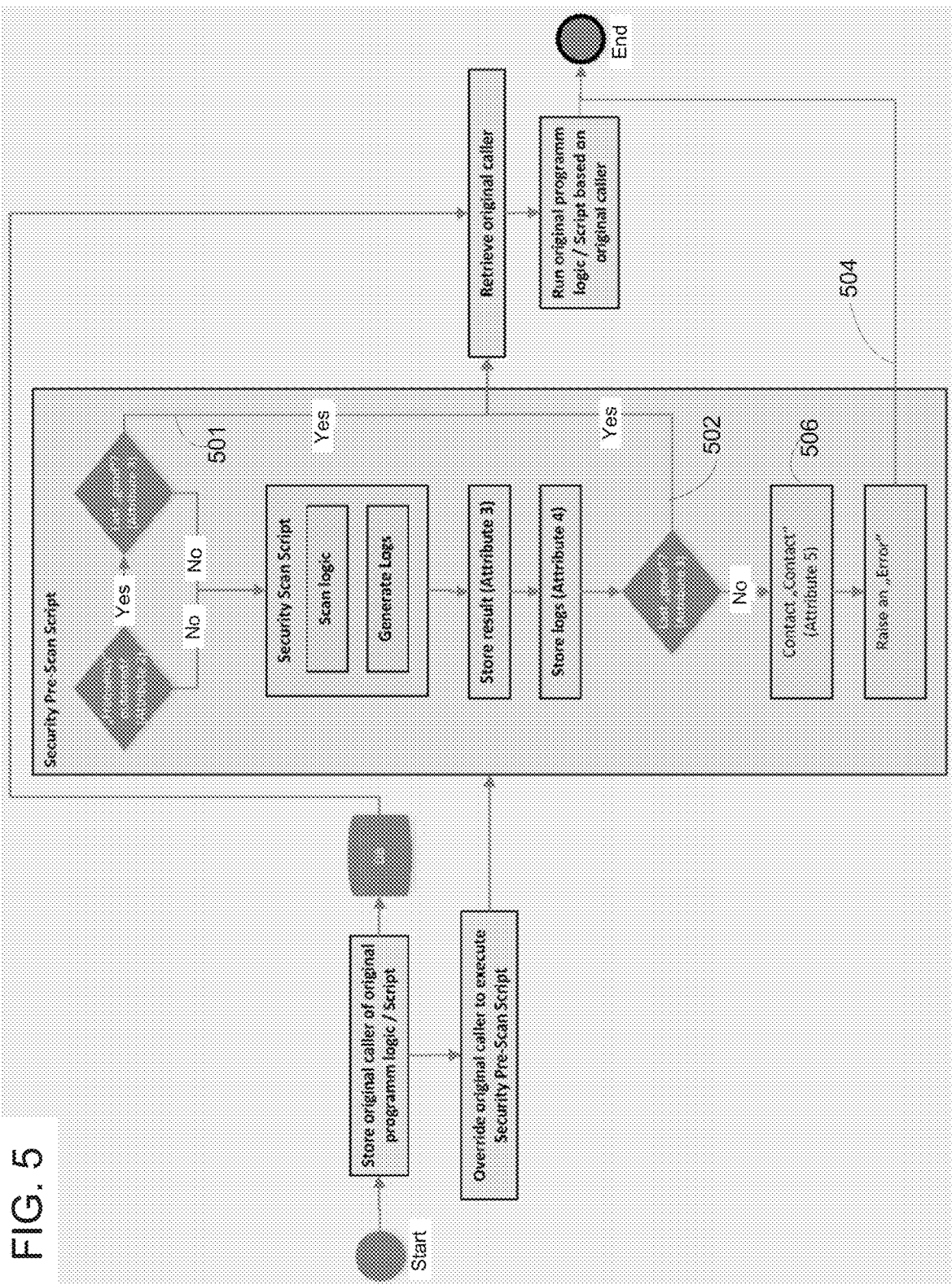
FIG. 5 shows a simplified diagram illustrating details of the image security scanning flow according to an exemplary embodiment.

The simplified flow 500 in the diagram of FIG. 5 shows that when an image is scanned during installation, the Attribute 3 can be compared with current timestamp to jump over (exempt) the scan procedure, when the most recent result is not older than the Attribute 2. This is shown as branch 501 in FIG. 5.

It is noted that the Attribute 3 may not be useful when an image is periodically scanned on a regular basis (rather than only upon installation).

The Docker system can extract files inside of Docker container, e.g. to fill:
Attribute 3 with a stored result, and
Attribute 4 with details of a stored result.

If scan result indicates "all good," normal functionality of the image will be performed. This is shown as branch 502 of FIG. 5.

Otherwise, an error will be raised to indicate that a more secured image needs to be provided. This is shown as branch 504 of FIG. 5.

Moreover, where the Attribute 5 is available, an alert 506 could be sent. That is, a party responsible for providing the more secured the image could be informed that the image has failed a security scan and that something needs to be done.

With special image design (e.g., the image is based on latest OS level version), it might be sufficient and possible to automatically re-create an up-to-date image. In other cases, it may be possible with the help of the image owner.

While the particular embodiment of the instant example utilizes an orchestrator in the form of DOCKER, this is not required. Alternative embodiments could be employed with other orchestrators, including but not limited to:
Artifactory Docker Registry
LXC (Linux)
Hyper-V and Windows Containers
rkt (compatible with KUBERNETES)
PODMAN open-source container engine
runC portability solution
containerd (a container runtime).

And, while the particular embodiment of the instant example utilizes PIPER script, this is also not required. Other forms of scripts could be used for image security scanning according to embodiments.

It is noted that various embodiments could leverage the processing power of an in-memory database engine (e.g., the in-memory database engine of the HANA in-memory database available from SAP SE), in order to perform various functions.

For example, while the particular embodiment of FIG. 1 shows the security engine as being located outside of the database, this is not required. Particular embodiments could have an in-memory database engine of an in-memory database responsible for storing the security and pre-security scan scripts, as the security engine.

Moreover, while the particular embodiment of FIG. 1 shows the image archive as being located outside of the database, this is also not required. According to certain embodiments an in-memory database engine of an in-memory database used for archiving the images (including image meta data), may perform the loading function.

Figure 6:
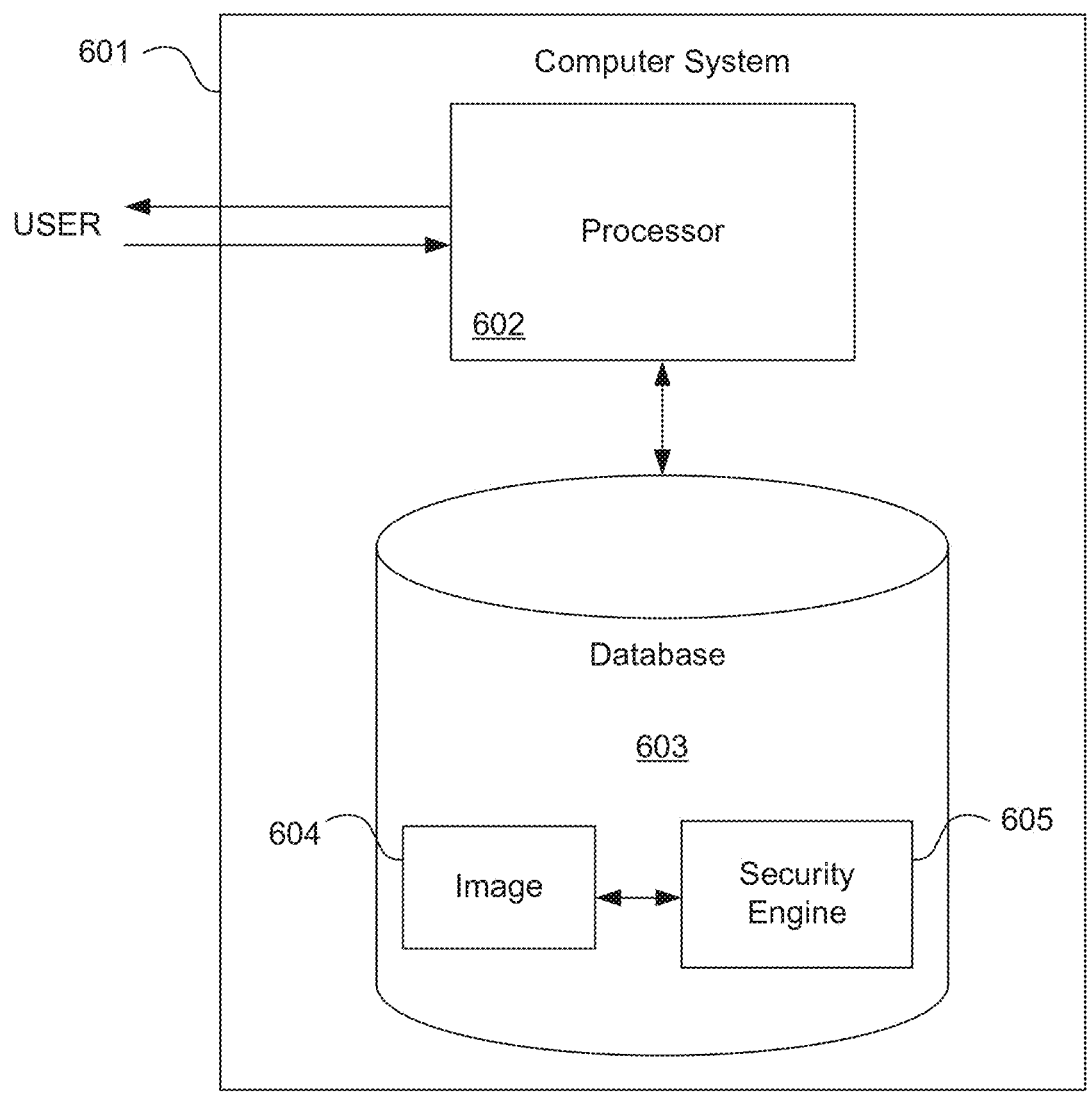
FIG. 6 illustrates hardware of a special purpose computing machine configured to implement image security scanning.

Thus FIG. 6 illustrates hardware of a special purpose computing machine configured to implement image security scanning according to an embodiment. In particular, computer system 601 comprises a processor 602 that is in electronic communication with a non-transitory computer-readable storage medium comprising a database 603. This computer-readable storage medium has stored thereon code 605 corresponding to a security engine. Code 604 corresponds to an image. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
receiving an image;
referencing a first attribute of image meta data to choose a security scan script stored in a non-transitory computer-readable storage medium; and
mounting the security scan script from the database for execution by an installation logic to create a container from the image, such that installation of the image is stopped where the security scan script issues an error.

Example 2. The computer implemented system and method of Example 1 wherein the first attribute identifies an operating system (OS).

Example 3. The computer implemented system and method of Examples 1 or 2 wherein the container comprises a Virtual Machine.

Example 4. The computer implemented system and method of Examples 1, 2, or 3 wherein the first attribute identifies an operating system (OS).

Example 5. The computer implemented system and method of Examples 1, 2, 3, or 4 further comprising:
referencing the first attribute to choose a security pre-scan script stored in the non-transitory computer readable storage medium; and
mounting the security pre-scan script for execution by the installation logic, such that execution of the security scan script is bypassed based upon a second attribute of image meta data.

Example 6. The computer implemented system and method of Examples 1, 2, 3, 4, or 5 further comprising:
referencing the first attribute to choose a security pre-scan script stored in the non-transitory computer readable storage medium; and
mounting the security pre-scan script for execution by the installation logic, such that the pre-scan script causes an alert to be issued to a contact identified by a second attribute of image meta data.

Example 7. The computer implemented system and method of Examples 1, 2, 3, 4, 5, or 6 wherein,
the non-transitory computer readable storage medium comprises an in-memory database; and
the referencing is performed by an in-memory database engine of the in-memory database.

An example computer system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a light emitting diode (LED) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving an image;
   referencing a first attribute of meta data of the image to choose a security scan script stored in a non-transitory computer-readable storage medium;
   referencing the first attribute to choose a security pre-scan script stored in the non-transitory computer readable storage medium;
   mounting the security scan script from the non-transitory computer-readable storage medium for execution by an installation logic to create a container from the image, wherein installation of the image is stopped based on an error issued by the security scan script; and
   mounting the security pre-scan script for execution by the installation logic, wherein execution of the security scan script is bypassed based upon a second attribute of meta data of the image examined by the security pre-scan script.

2. A method as in claim 1 wherein the first attribute identifies an operating system (OS).

3. A method as in claim 1 wherein the container comprises a Virtual Machine.

4. A method as in claim 1 wherein:
   the first attribute identifies an operating system (OS); and
   the second attribute indicates a frequency.

5. A method as in claim 1 wherein:
   the first attribute identifies an operating system (OS); and
   the second attribute indicates a last good security scan of the image.

6. A method as in claim 1 further comprising:
   referencing the first attribute to choose a particular security pre-scan script stored in the non-transitory computer readable storage medium; and
   mounting the particular security pre-scan script for execution by the installation logic, wherein the pre-scan script causes an alert to be issued to a contact identified by a second attribute of image meta data.

7. A method as in claim 1 wherein:
   the non-transitory computer readable storage medium comprises an in-memory database; and
   the referencing to choose the security scan script and the referencing to choose the security pre-scan script are performed by an in-memory database engine of the in-memory database.

8. A method as in claim 7 wherein:
   the image is received from an archive; and
   the archive comprises the in-memory database.

9. A method as in claim 1 wherein executing the security scan script further comprises specifying that the security scan script is executed before a plurality of original image instantiation logic scripts.

10. A non-transitory computer readable storage medium embodying a computer program for performing a method, said method comprising:
    receiving an image;
    referencing a first attribute of meta data of the image to choose a security scan script stored in the non-transitory computer readable storage medium;
    referencing the first attribute to choose a security pre-scan script stored in the non-transitory computer readable storage medium;
    mounting the security scan script from the non-transitory computer readable medium for execution by an installation logic to create a container from the image, wherein installation of the image is stopped based on an error issued by the security scan script; and
    mounting the security pre-scan script for execution by the installation logic, wherein execution of the security scan script is bypassed based upon a second attribute of meta data of the image examined by the security pre-scan script.

11. A non-transitory computer readable storage medium as in claim 10 wherein:
    the first attribute identifies an operating system; and
    the second attribute indicates frequency.

12. A non-transitory computer readable storage medium as in claim 10 wherein:
    the first attribute identifies an operating system; and
    the second attribute indicates a last good security scan of the image.

13. A non-transitory computer readable storage medium as in claim 10 wherein the container comprises a Virtual Machine (VM).

14. A non-transitory computer readable storage medium as in claim 10 wherein:
    the non-transitory computer readable storage medium comprises an in-memory database;
    the image is received from an archive stored in the in-memory database; and
    the referencing to choose the security scan script and the referencing to choose the security pre-scan script are performed by an in-memory database engine of the in-memory database.

15. A computer system comprising:
    one or more processors;
    one or more memories;
    a software program, executable on said computer system, the software program configured to cause an in-memory database engine of an in-memory database to:
    receive an image;
    reference a first attribute of meta data of the image to choose a security scan script stored in the in-memory database;

reference the first attribute to choose a security pre-scan script stored in the in-memory database;

mount the security scan script from the in-memory database for execution by an installation logic to create a container from the image, wherein installation of the image is stopped based on an error issued by the security scan script; and mount the security pre-scan script for execution by the installation logic, wherein execution of the security scan script is bypassed based upon a second attribute of meta data of the image examined by the security pre-scan script.

16. A computer system as in claim 15 wherein the first attribute identifies an operating system.

17. A computer system as in claim 15 wherein the container comprises a virtual machine.

18. A computer system as in claim 15 wherein the second attribute indicates a frequency.

19. A computer system as in claim 15 wherein the second attribute indicates a last good security scan of the image.

20. A computer system as in claim 15 wherein executing the security scan script further comprises specifying that the security scan script is executed before a plurality of original image instantiation logic scripts.

* * * * *